US007853864B2

(12) United States Patent
Ro et al.

(10) Patent No.: US 7,853,864 B2
(45) Date of Patent: Dec. 14, 2010

(54) DEVICE AND METHOD FOR MODALITY CONVERSION OF MULTIMEDIA CONTENTS

(75) Inventors: Yong-Man Ro, Daejeon-si (KR); Yong-Ju Jung, Seoul (KR); Jin-Woo Hong, Daejeon-si (KR); Je-Ho Nam, Seoul (KR); Jin-Woong Kim, Daejeon-si (KR)

(73) Assignees: Electronics and Telecommunications Research Institute, Daejeon (KR); Korea Advanced Institute of Science and Technology (Kaist), Daejeon (KR)

( * ) Notice: Subject to any disclaimer, the term of this patent is extended or adjusted under 35 U.S.C. 154(b) by 1217 days.

(21) Appl. No.: 10/545,632

(22) PCT Filed: Feb. 13, 2004

(86) PCT No.: PCT/KR2004/000287

§ 371 (c)(1),
(2), (4) Date: Jun. 9, 2006

(87) PCT Pub. No.: WO2004/072861

PCT Pub. Date: Aug. 26, 2004

(65) Prior Publication Data

US 2006/0294546 A1    Dec. 28, 2006

(30) Foreign Application Priority Data

Feb. 13, 2003  (KR) .................. 10-2003-0009069

(51) Int. Cl.
*G06F 17/00* (2006.01)
*G06F 17/20* (2006.01)
(52) U.S. Cl. ....................... 715/201; 715/239
(58) Field of Classification Search ............ 715/201, 715/239
See application file for complete search history.

(56) References Cited

U.S. PATENT DOCUMENTS 6,006,242 A * 12/1999 Poole et al. ............. 715/209

(Continued)

FOREIGN PATENT DOCUMENTS

GB        2 308 526        6/1997

(Continued)

OTHER PUBLICATIONS

Mohan et al., "Adapting Multimedia Internet Content for Universal Access", IEEE, 1999, pp. 104-114.*

(Continued)

*Primary Examiner*—Doug Hutton
*Assistant Examiner*—James J Debrow
(74) *Attorney, Agent, or Firm*—Haynes and Boone, LLP; Michael Shenker (57) ABSTRACT

The present invention relates to a method of systematically and synthetically accessing modality conversion that is an important part in the contents adaptive conversion process of a universal multimedia access system. The present invention provides an effective method of solving a problem, which is incurred at the time of modality conversion and still remains as one of difficult problems incurred during adaptive contents conversion. For this purpose, the present invention includes overlapped contents modeling newly proposed to determine modality conversion, a method of flexibly and clearly expressing and applying user preference for the modality conversion, and a resource allocation method of distributing resources among complicated contents based on the user preference. As a result, the integration of the above three methods provides a synthetic solution, particularly, to a problem incurred in the modality conversion and, generally, to a problem incurred in the adaptive conversion of contents.

21 Claims, 5 Drawing Sheets

U.S. PATENT DOCUMENTS

| | | | |
|---|---|---|---|
| 6,012,030 | A * | 1/2000 | French-St. George et al. .................... 704/275 |
| 6,345,279 | B1 * | 2/2002 | Li et al. .................... 707/104.1 |
| 6,810,429 | B1 * | 10/2004 | Walsh et al. ................ 709/246 |
| 6,970,602 | B1 * | 11/2005 | Smith et al. ................ 382/232 |
| 7,136,909 | B2 * | 11/2006 | Balasuriya .................. 709/220 |
| 2001/0038610 | A1 | 11/2001 | Decker et al. |
| 2003/0236904 | A1 * | 12/2003 | Walpole et al. ............. 709/231 |

FOREIGN PATENT DOCUMENTS

| | | |
|---|---|---|
| JP | 11-288403 | 10/1999 |
| JP | 2002-334034 | 11/2002 |
| KR | 10-2001-68006 | 7/2001 |
| KR | 10-2002-36177 | 5/2002 |
| KR | 10-2002-63830 | 8/2002 |
| KR | 10-2003-504 | 1/2003 |
| WO | WO 98/37698 | 8/1998 |

OTHER PUBLICATIONS

Berhe et al. "Modeling Service-Based Multimedia Content Adaptation in Pervasive Computing", ACM, 2004, pp. 60-69.*

Channaruki et al.,"Multiface: Multimodal Content Adaptions for Heterogeneous Devices", ACM, 2004, pp. 319-320.*

Patent Abstracts of Japan, Publication No. 11-288403, Oct. 19, 1999, 1 p.

Korean Patent Abstracts, Publication No. 1020010068006, Jul. 13, 2001, 1 p.

Korean Patent Abstracts, Publication No. 1020020036177, May 16, 2002, 2 pp.

Korean Patent Abstracts, Publication No. 1020020063830, Aug. 5, 2002, 2 pp.

Korean Patent Abstracts, Publication No. 1020030000504, Jan. 6, 2003, 2 pp.

Patent Abstracts of Japan, Publication No. 2002-334034, Nov. 22, 2002, 1 p.

Ma, Wei-Ying et al., "A framework for adaptive content delivery in heterogeneous network environments," *Proceedings of the SPIE*, vol. 3969, pp. 86-100, Jan. 2000.

Office Action dated Feb. 10, 2009, Counterpart European Patent Application No. 04 711 057.2, 4 pp.

* cited by examiner

DEVICE AND METHOD FOR MODALITY CONVERSION OF MULTIMEDIA CONTENTS

TECHNICAL FIELD

The present invention relates, in general, to a device and method for adaptively converting the modality of multimedia contents and, more particularly, to a method of systematically and synthetically accessing modality conversion that is an important part in the contents adaptive conversion process of a universal multimedia access system.

BACKGROUND ART

In a system for consuming universal multimedia, the adaptive conversion of contents is an important process to provide the best representation method of the contents under a requirement that the adaptive conversion of contents must support various kinds of terminals and various network accesses. The adaptive conversion of contents may be considered from two points of views. One is modality conversion that converts contents from one modality (e.g., video) to another modality (e.g., image). The other is contents transcoding that changes the bit rate (or quality) of contents without converting the modality of the contents. In many theses, the term transcoding is frequently used as the meaning of the modality conversion. However, in the present invention, the two terms are used distinctively as described above for the purpose of clarity. A modality includes not only a mode, such as video, images, graphic images, audio and text, but also coding format, such as MPEG, JPEG and GIF.

It is assumed that a multimedia document formed of multiple contents items is transmitted to a user and consumed in a terminal. To adapt the document to a provided resource restriction (e.g., a total bit rate or a total amount of data), determination related to the Quality of Service (QoS) for modality conversion in a determination engine (104 of FIG. 1) must reflect answers to two basic questions for all the contents items, that is, when the modality conversion should be performed and what the modality of an output contents item is. Especially, answers to the two basic questions, which reflect the preference of the user from the viewpoint of the user, are required.

Figure 1:
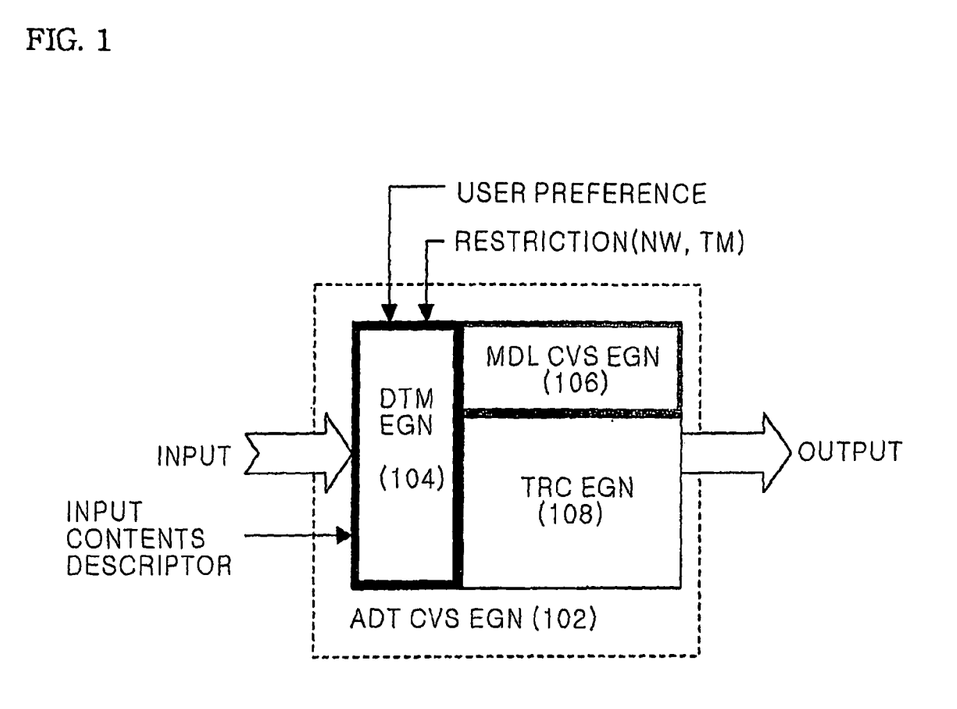
FIG. 1 is a configuration diagram of an adaptive conversion device according to the present invention.

Without the answers to the two questions, proper modality conversion and contents transcoding technology suitable for adapting contents cannot be applied. Until now, there has been no systematical research capable of simultaneously answering the two basic questions. The determination process of the determination engine 104 for dealing with such questions is first represented by a conventional resource allocation problem as described in a thesis entitled "Adapting Multimedia Internet Contents for Universal Access," Rakesh Mohan, John R. Smith, and Chung-Sheng Li, "IEEE Trans. Multimedia," Vol. 1, No. 1, pp. 104-114, March 1999.

$R_i$ and $V_i$ are the resource and contents value of a contents item i in a document, respectively. In this case, the resource of a contents item can be the amount of data or a bit rate, and the contents value designates the amount of information transmitted through the contents. Universally, the Vi is a function that is not reduced with respect to the Ri, and depends on subjective evaluation that varies with persons. The contents value is represented by following Equation.

$$V_i = f_i(R_i, P_i, M) \quad (1)$$

In Equation 1, the contents value $V_i$ is represented by the function of a resource $R_i$, modality support capability M, and user preference $P_i$. In this case, a resource allocation for the contents item i can be represented by the following Equation 2.

$$\left(\sum_i V_i \text{ is maximum}\right) \wedge \left(\sum_i R_i \leq R_c\right) \wedge \quad (2)$$

(satisfaction of user preference)

where $\wedge$ indicates a logical AND. Equation 2 imports that a condition on the user preference requires that a modality especially desired by the user must be reflected first in the resource allocation. For example, when a sight-impaired person who is weak to the visual representation of information consumes multimedia, an audio modality must be reflected in the resource allocation prior to video, image and text modalities.

A problem arises in that a set of $\{R_i\}$ satisfying a resource restriction $R_c$ and the condition on the user preference given in Equation 2 should be found. The present invention basically deals with a solution to the problem from the viewpoint of the modality conversion that considers the user preference.

In a conventional access method, a contents value is related with a resource according to a single analyzing function (e.g., logarithm function) or a random curve designated by a producer or a provider. However, a contents value model represented by the single analyzing function cannot exhibit a correlation between contents values existing in other modalities. Especially, a user preference condition cannot be reflected in contents modeling.

Additionally, conventional access methods considering the user preference in contents modality conversion cannot concretely reflect an actual situation. For example, it is assumed that a specific video clip in a server should be converted and transmitted to a terminal, and the terminal supports all the modalities of images, audio and text except for the modality of video. In the early stage of transmission, the bandwidth of a network is sufficient to transmit images, converted from the video, to the terminal. However, if the bandwidth is too narrow to transmit the converted images at the point when time has elapsed, the video needs to be converted into the audio modality that requires a narrower bandwidth. Even, the conversion of the video into text is required. By the above example, it can be clearly understood that modality conversion having a conversion sequence depending on the variable characteristics of a network bandwidth handled by the present invention is necessary.

As another example, it is assumed that a network can transmit all the modalities of video, images, audio and text. There is a possibility that a user changes the terminal thereof while utilizing contents. In the case where the user uses a Personal Digital Assistant (PDA), the PDA is suitable for processing the image modality rather than the video modality and can show most images due to the characteristics thereof, so that the conversion of the video into images is selected. However, if the user changes the terminal from the PDA to a mobile phone, the modality conversion of the video into audio is required. The above-described example shows the necessity of modality conversion that can occur due to the different capabilities of terminals in a session shift.

Actually, it is very difficult that a user predicts the characteristics of a temporary network or inspects the processing capability of a new terminal in a short time. Additionally, the selection of modality conversion is input whenever an important change occurs may cause considerable inconvenience to the user. The conventional methods cannot propose a method of solving the problem on the flexible and clear expression of user preference for the modality conversion. Additionally, conventional research in the resource allocation method focuses only on the contents transcoding, and does not describe when and how the modality conversion is determined, which are two questions for all contents items. Furthermore, the user preference for the modality conversion is not properly dealt with in the research.

DISCLOSURE OF THE INVENTION

Accordingly, an object of the present invention is to provide a device and method for automatically converting a multimedia modality while reflecting user preference according to a resource restriction.

Another object of the present invention is to perform the modeling of the relation between contents values and resources, and represent user preference in relation to the modeling.

The present invention includes a contents value model representing the relation between contents values and resources, a method of clearly expressing user preference to provide a flexible method that gives a user opportunities to make the selections of modality conversion, and a resource allocation method of distributing resources among multiple contents. Additionally, the present invention uses a designated conversion sequence and information on importance or a weight so as to change the contents value model using the user preference. Such access methods can deal with the multiple contents of a complicated document and accommodate different restrictions that may occur not only by user preference but also by a terminal or a network.

In order to accomplish the above object, the present invention provides a device for adaptively converting a modality of multimedia contents, including an engine receiving multimedia contents, metadata of the multimedia contents, user preference for the modality conversion and a resource restriction, and determining time and a method of converting a modality, and an engine converting the modality of the input multimedia contents according to the time and method of converting determined by the determination engine.

The determination engine may include a means for predicting an overlapped contents model using the input multimedia contents and input metadata of the contents, a means for modifying the overlapped contents model using the user preference for the modality conversion, and a means for determining time and a method of converting the modality of the multimedia contents according to the resource restriction so as to allow the multimedia contents to be represented in a form corresponding to a maximum contents value of the modified overlapped contents model. The means for modifying the overlapped contents model may additionally modify the overlapped contents model. The determination engine may additionally determine the bit rate of the multimedia contents according to the resource restriction, and the device further including a contents transcoding engine converting the bit rate of the input multimedia contents according to the bit rate determined by the determination engine and outputting the contents at the converted bit rate.

The user preference for the modality conversion may be described in an extended Markup Language (XML) form. The user preference for the modality conversion may include user preference for general contents modality conversion and user preference for specific modality conversion.

In order to accomplish the above object, the present invention provides a method of adaptively converting a modality of multimedia contents, including receiving multimedia contents and the metadata of the multimedia contents from an outside, receiving user preference for modality conversion, adaptively converting the modality of the input multimedia contents according to the metadata of the contents and the user preference for the modality conversion, and outputting the converted multimedia contents. The adaptive conversion of the modality may be performed while additionally considering the resource restriction.

The adaptively converting of the modality may include predicting an overlapped contents model using the input multimedia contents and the input metadata of the contents, modifying the overlapped contents model using the user preference for modality conversion, and converting a modality of the multimedia contents to allow the multimedia contents to be represented in a form corresponding to a maximum contents value of the modified overlapped contents model under the resource restriction.

In order to accomplish the above object, the present invention provides a device for adaptively converting a modality of multimedia contents, including a means for receiving multimedia contents and the metadata of the multimedia contents from an outside source, a means for receiving user preference for modality conversion represented by the sequence and weight of the modality conversion, a means for adaptively converting the modality of the input multimedia contents according to the metadata of the contents and the user preference for the modality conversion, and a means for outputting the converted multimedia contents.

To help the understanding of the present invention, several basic terms need to be clarified. A multimedia document is an aggregate of multiple contents items, and a contents item is an entity transmitting complete information, such as news and a football game, that can be represented by a means, such as video, images and text. That is, the term contents item does not refer to the physical carrier of information but information itself. The contents item can have many contents versions of different qualities and modalities. A contents version is a physical individual of a contents item, and can be, for example, a continuous image, an audio file, or a text paragraph, which represent information on the football game.

An access process is described below. A specific contents value model connecting the contents value of a contents item to a resource is given to the contents item. In this case, the contents value model is modified according to user preference and terminal capability. Thereafter, to distribute the resources among multiple contents items, a method of allocating resources is used. When the allocated resource is mapped to the contents value model, the proper quality and modality of the adapted contents can be obtained.

The contents value model exhibits the relation between a contents value, which is the amount of information transmitted by contents, and a resource. The present invention proposes a new contents model referred to as an overlapped contents model that reflects a user preference condition to support QoS determination for modality conversion.

BEST MODE FOR CARRYING OUT THE INVENTION

Hereinafter, the embodiments of the present invention are described in detail with reference to the attached drawings. The same reference numerals in the drawings are used to designate the same or similar components, or same or similar signals.

FIG. 1 is a configuration diagram of an adaptive conversion device according to the present invention. As shown in the drawing, the device includes three main parts, including a determination engine 104, a contents modality conversion engine 106, and a transcoding engine 108.

The determination engine 104 receives multimedia contents and the descriptor of the multimedia contents (metadata). Additionally, some other information on user preference for modality conversion and a resource restriction (network or terminal) is input to the determination engine 104. To allow the adapted contents to have the best value or quality when represented to a user, the determination engine 104 analyzes the contents descriptor, the user preference and the restriction, and makes optimal determination for modality conversion and contents transcoding.

The contents modality conversion engine 106 and the transcoding engine 108 include concrete descriptors to adaptively convert contents according to the instruction of the determination engine 104. If the contents need to be adaptively converted without the conversion of the modality thereof, the contents are directly connected to the transcoding engine 108. If the modality of the contents needs to be converted, the contents are connected to the modality conversion engine 106, and then passed through the transcoding engine 108 to be adapted to a required output bit rate.

The contents modality conversion engine 106 and the transcoding engine 108 can be connected off-line or on-line. In the case of the off-line connection, prior to the adaptive conversion, the modality conversion engine 106 converts the contents into contents of another modality, and the transcoding engine 108 converts contents of a modality into a version of another quality (or another bit rate). In the adaptive conversion process, the determination engine 104 selects only a specific modality or a version of proper quality for each of input contents to obtain adaptively converted output contents. In the case of the on-line connection, the determination engine 104 should learn a proper modality for input contents and, at this time, further learn a transcoding format and a level for the input contents. In this case, the modality conversion engine 106 and the transcoding engine 108 must have high calculation efficiency to meet a demand for real-time conversion.

In this system, preference information needs to be represented in a structured form, such as XML for the clear expression and application of the user preference. Table 1 is a view showing the user preference descriptor of the modality conversion proposed by the present invention in XML form.

TABLE 1

```
<!-- ################################################## -->
<!-- Definition of ConversionPreference -->
<!-- ################################################## -->
<complexType name="ConversionPreferenceType">
   <complexContents>
      <extension base="dia:UserCharacteristicBaseType">
         <sequence>
            <element name="GeneralResourceConversions"
               type="dia:ResourceConversionType" minOccurs="0"/>
            <element name="SpecificResourceConversions"
               type="dia:SpecificResourceConversionsType" minOccurs="0"/>
         </sequence>
      </extension>
   </complexContents>
</complexType>
<complexType name="ResourceConversionType">
   <complexContents>
      <extension base="dia:DIABaseType">
         <sequence>
               <element name="Conversion" type="dia:ConversionType"
                  minOccurs="0" maxOccurs="unbounded"/>
         </sequence>
      </extension>
   </complexContents>
</complexType>
<complexType name="ConversionType">
   <complexContents>
      <extension base="dia:DIABaseType">
         <sequence>
               <element name="From" type="mpeg7:ControlledTermUseType"
                  minOccurs="0"/>
                  <element name="To" type="mpeg7:ControlledTermUseType"/>
         </sequence>
         <attribute name="order" type="nonNegativeInteger"
```

TABLE 1-continued

```
                use="required"/>
            <attribute name="weight" type="mpeg7:nonNegativeReal"
                    use="optional" default="1.0"/>
        </extension>
    </complexContents>
</complexType>
<complexType name="SpecificResourceConversionsType">
    <complexContents>
        <extension base="dia:DIABaseType">
            <sequence>
                <element name="Object" minOccurs="0" maxOccurs="unbounded">
                    <complexType>
                        <complexContents>
                            <extension base="dia:ResourceConversionType">
                                <attribute name="target" type="anyURI"
                                    use="required"/>
                            </extension>
                        </complexContents>
                    </complexType>
                </element>
            </sequence>
        </extension>
    </complexContents>
</complexType>
```

Figure 2:
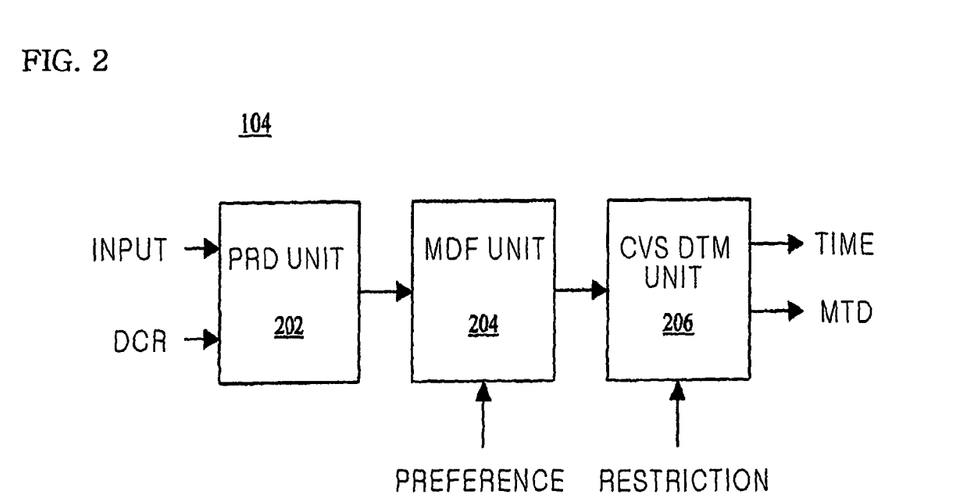
FIG. 2 is a configuration diagram showing an example of the determination engine of FIG. 1.

FIG. 2 is a configuration diagram showing the determination engine of FIG. 1 according to an embodiment of the present invention. As shown in the drawing, the determination engine 104 includes an overlapped contents model prediction unit 202, an overlapped contents model modification unit 204, and a modality conversion determination unit 206.

The overlapped contents model prediction unit 202 receives multimedia contents and a descriptor (or metadata) for the multimedia contents from an outside through a network, and predicts an overlapped contents model using the multimedia contents and the descriptor. The overlapped contents model modification unit 204 modifies the overlapped contents model, generated in the overlapped contents model prediction unit 202, using the user preference for modality conversion. The modality conversion determination unit 206 determines the time and method of converting the modality of the multimedia contents according to a resource restriction to represent the multimedia contents in the form corresponding to a maximum contents value of the modified overlapped contents model, and outputs data representing the time and method. The overlapped contents model modification unit 204 can additionally modify the overlapped contents model according to the type of the terminal of a user.

Figure 3:
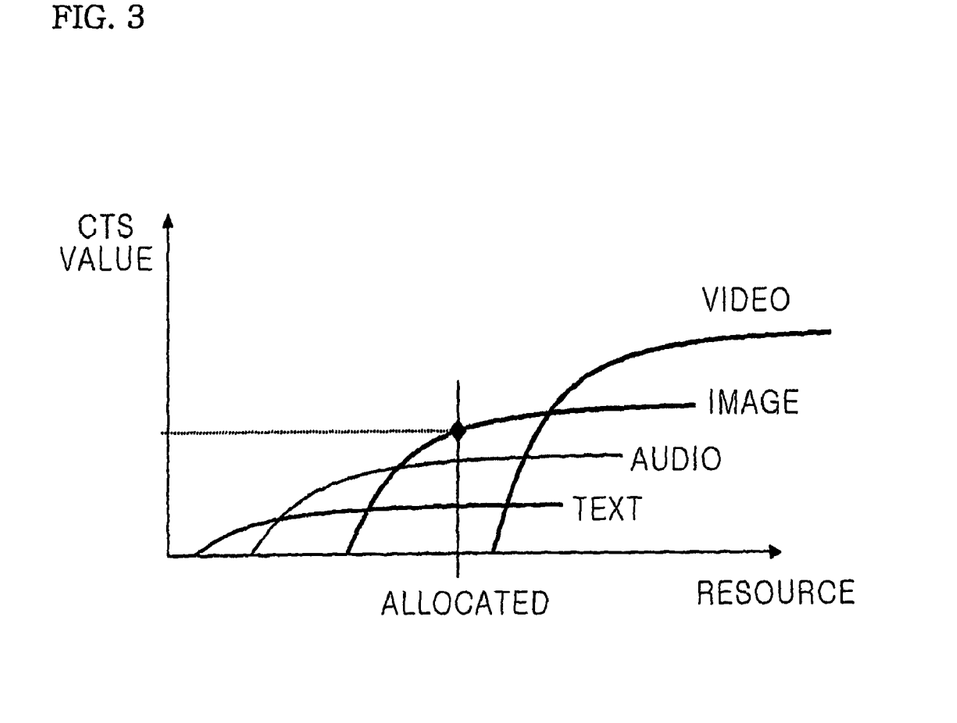
FIG. 3 is a view illustrating the overlapped contents value model of contents items of the present invention.

FIG. 3 shows an overlapped contents value model representing the relations between resources and the contents values of modalities for contents items. A curve for each of the modalities may be designated by a contents provider, or may be provided by an analyzing function. Each of points on modality curves corresponds to the version of the modality. In this model, the number of curves is the number of modalities that a contents item has.

Figure 4:
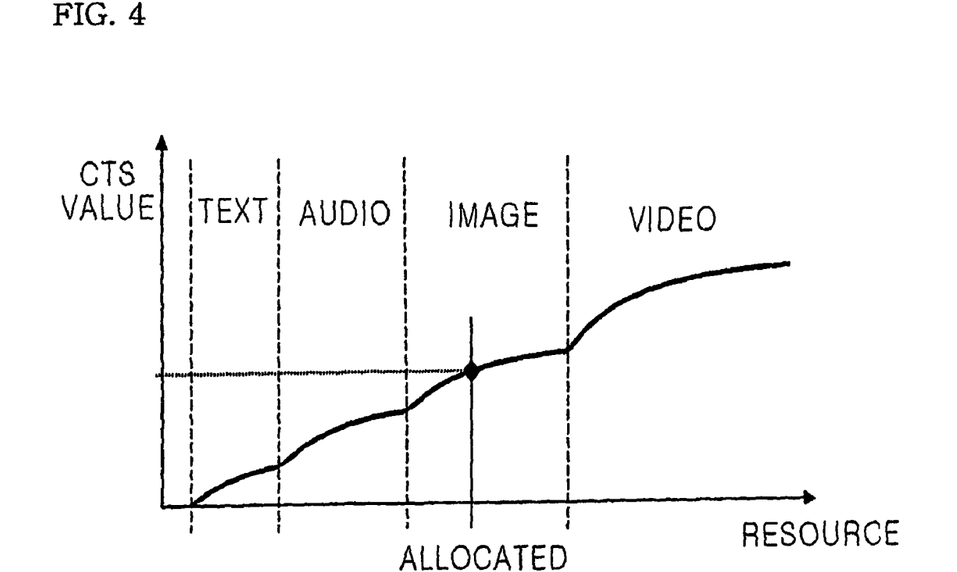
FIG. 4 is a view showing the concept of the final contents value function of the contents items of the present invention.

As shown in FIG. 4, the final contents value function is represented by the upper contour of the overlapped model, and intersection points represent boundaries between the modalities. If the allocated resource of a contents item is given, we can easily find the proper modality and contents value of the contents item.

A contents value is definitely a subjective value. The contents value not only depends on the amount of resources but also can be vary with users. The present invention first considers a correlative tendency between contents values and resources and, additionally, considers the dependency of the contents values on users. In the latter, the upper contour is changed depending on user preference and modalities supported by a terminal.

$$V_i = \max\{VM_{ij}\}, j=1 \ldots K \quad (3)$$

In Equation 3, $V_i$ is the contents value of a contents item, and $VM_{ij}$ is a contents value curve for the modality j of the contents item i. In this case, $j=1 \ldots K$, K is the number of modalities for the contents item i, and $VM_{ij} \geq 0$ must be fulfilled.

Of course, the curves of modalities may be random. However, if an acceptable analyzing function modeling a contents value in each of modalities can be found, the function will be more effective. In a thesis entitled "Adapting Multimedia Internet Contents for Universal Access," Rakesh Mohan, John R. Smith, and Chung-Sheng Li, "IEEE Trans. Multimedia," Vol. 1, No. 1, pp. 104-114, March 1999, a natural logarithm function (ln) is used to link contents values and resources, irrespective of the modality of contents.

$$V = a * \ln(R) \quad (4)$$

In Equation 4, V is the contents value, R is the resource, and a is the proportional factor. However, let's consider the specific case where the resource increases to infinity. It is actually clear that the cognitive information of the user is limited. Nevertheless, the logarithm function has an infinite contents in the nature thereof.

The present invention proposes a simple analyzing function for the curve of each of the modalities as shown in Equation 5.

$$\text{For } R_i \geq b_{ij}, VM_{ij} = a_{ij}(R_i - b_{ij})/(R_i - b_{ij} + c_{ij}) \quad (5)$$

Figure 5:
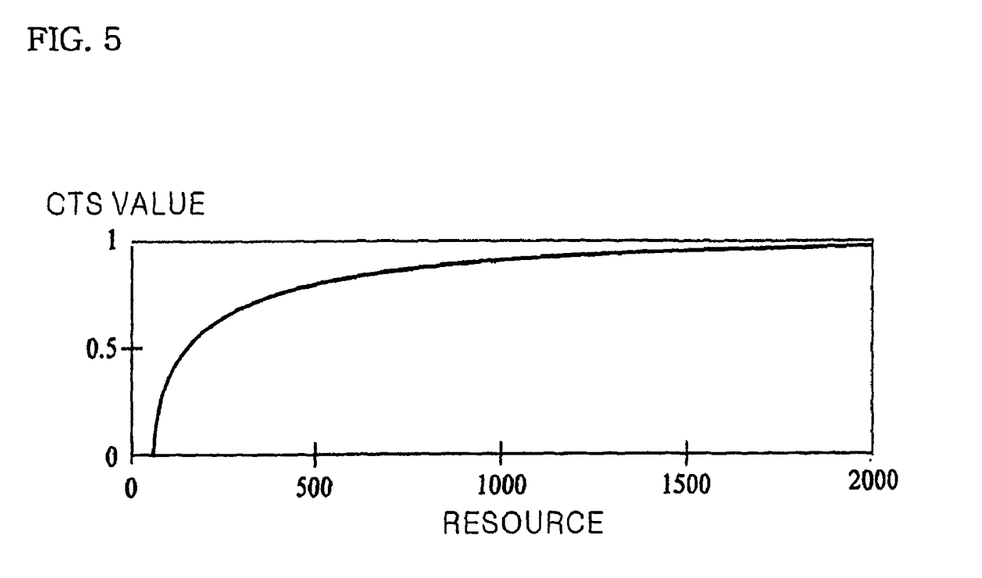
FIG. 5 is a view showing an example of the analyzing function of a modality curve according to the present invention.

FIG. 5 shows an analyzing function in case $a_{ij}$ is equal to 1, $b_{ij}$ is equal to 50, and $c_{ij}$ is equal to 100 in Equation 5. From FIG. 5, it can be understood that a is the upper limit of the function, b is the start point of the function, and c adjusts the inclination of the function. In case of using the analyzing function, other contents can be modeled by adjusting the parameters a, b, and c. The analyzing function can be extended in various manners to accommodate the complicated contents value model of a specific contents form.

In addition to the overlapped contents model, the present invention provides a function capable of controlling various forms of modality conversion from the standpoint of the user. The present invention provides a concrete method of clearly expressing the various modality conversion preference of the user.

Two situations are considered for the clear expression of user preference. One is the case where the user desires adaptive conversion for general contents having a specific modality, and the other is the case where the user desires modality conversion only for specific contents. Accordingly, in the present invention, the general contents and the specific contents are separately considered.

In the case of modality conversion for the general contents, the user does not have information on the details of contents. Accordingly, the user cannot designate different types of modality conversion according to the details of the contents, and can perform only uniform modality conversion. All the contents belonging to a specific modality have same possibility of being converted into a designated modality. For example, an image modality is generally selected to be converted into an audio modality, but a hearing-impaired user selects the conversion of the image modality into a text modality rather than into the audio modality, irrespective of the details of the contents.

Second, in the case of modality conversion for the specific contents, the user already has information on the contents. Accordingly, in this case, the user can perform a different type of selective conversion for specific contents objects having the same modality. For example, in the case of converting a concert video under the situation in which a user is aware of information on the fact that specific contents are formed in a video modality, the concert video is converted into audio. It is possible to convert other remaining contents of the video modality into contents of an image or a text modality.

The designation of user preference is divided into two steps to deal with the above-described two situations. First, the user designates the relative sequence of converting a modality into convertible modalities. Second, the user numerically designates importance or a weight representing user preference for each type of modality conversion. Attention has to be paid to the fact that the importance or a weight does not refer to importance or a weight for the contents item, but importance or a weight for modality conversion even in a contents item.

That is, the first step corresponds to the clear expression of user preference in terms of quality, and the second step corresponds to the clear expression of use preference in terms of quantity. Of cause, the user designates only a sequence at the first step, and then can implicitly use a default value at the second step of designating the importance. The conversion sequence designated as described above enables the determination engine 104 to determine into which a modality is converted when the modality conversion is required to be performed. Additionally, the importance information for the designated conversion enables the determination 104 to determine when the modality conversion is performed. That is, the importance information is used to adjust the contents value curve of each of modalities according to the proportion thereof.

For example, in relation to the sequence of modality conversion regarding a video modality, the conversion of video into video can be designated to be first, the conversion of video into images can be designated to be second, the conversion of video into audio can be designated to be third, and the conversion of video into text can be designated to be fourth. In relation to the weight of the modality conversion, non-conversion of video can be designated to be "1.5," the conversion of video into images can be designated to be "1.0," the conversion of video into audio can be designated to be "1.0," and the conversion of video into text can be designated to be "1.0.". As shown in the example, in the case where the weight of the non-conversion of video is relatively higher than others, the non-conversion of video continues for a long time, so that the next turn of converting of video into images occurs relatively late.

The contents value models of contents items are important additional input values in the adaptive conversion process. The change of the contents value models causes a result in which an output is changed in the adaptive conversion process.

In the adaptive conversion process, modalities supported by a terminal and the user preference need to be considered. Such restrictions are used to change a contents value model, and an output can be properly changed according to the restrictions. Additionally, it is required that a resource allocation algorithm should be maintained separately from input information as much as possible. This separation enables the adaptive conversion process to be modularized. For definition, the sequence of changing contents value models according to terminal characteristics and user preference is described.

First, the modality support characteristics of a terminal are considered. In the case where a terminal does not support a specific modality, contents whose modality is not supported are not processed in the terminal. The contents value of the contents is zero. That is, a contents value curve whose modality is not supported should be removed from the adaptive conversion process. Equation 6 includes the above-described contents.

$$V_i = \max\{VM_{ij}\}, \text{ where j is supported modalities} \tag{6}$$

Figure 6:
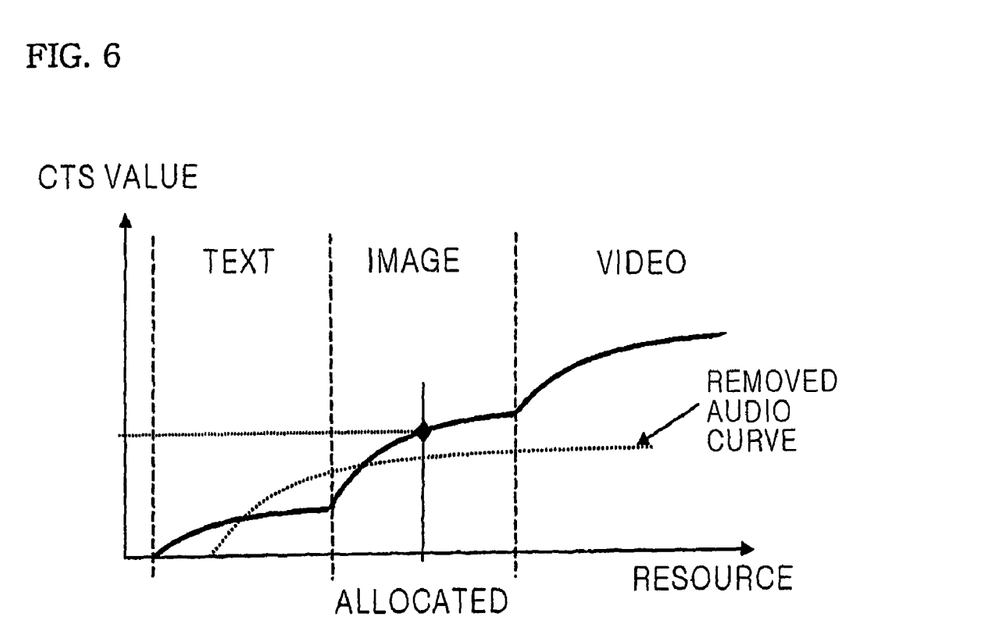
FIG. 6 is a view showing an example of a contents value model modified by the modality capability according to the present invention.

FIG. 6 shows an example in the case where an audio modality is not supported. The curve of the audio modality is removed and, as a result, the audio curve is replaced with the curves of text and image modalities.

Second, in the modality conversion, user preference for the conversion sequence is considered. Actually, in the contents value model previously defined, a conversion sequence is already determined. However, in this case, the defined sequence is allocated by not a contents user but a contents provider. For example, as shown in FIG. 4, video, which is an original modality, may have a sequence in which the conversion of video into video, that is, non-conversion of video is first, the conversion of video into images is second, the conversion of video into audio is third, and the conversion of video into text is fourth.

The user can change the conversion sequence based on conventional information provided by the contents provider. If there is modality conversion whose turn in existing conversion sequence is prior to the conversion sequence based on the user preference after the inspection of information on an existing conversion sequence and information on new conversion based on the user preference, the modification of the contents value model is performed in such a way that a curve corresponding to the modality conversion is removed.

Figure 7:
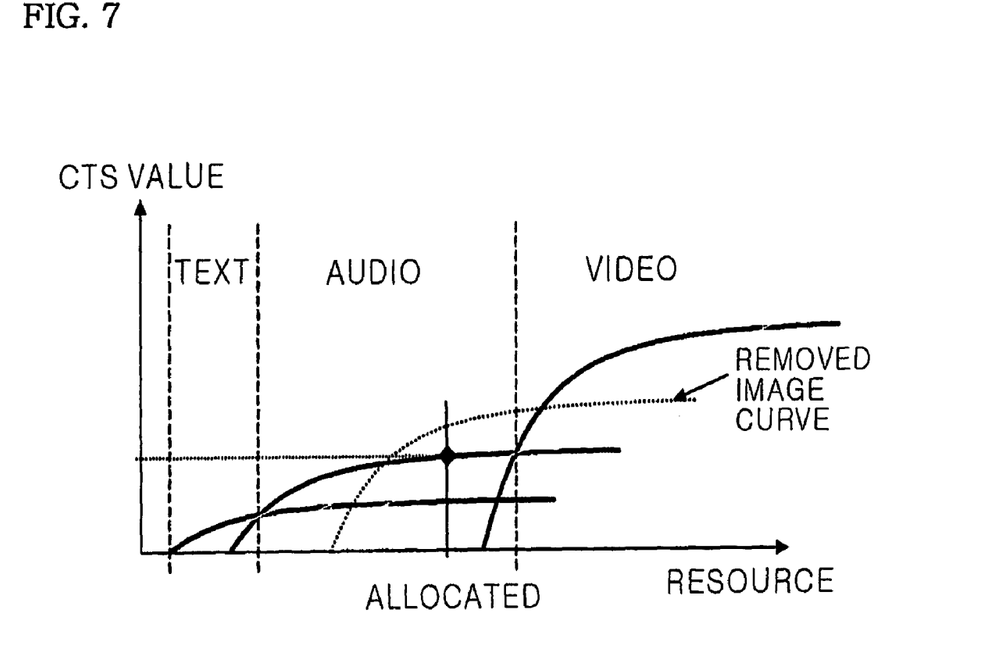
FIG. 7 is a view showing an example of a contents value model based on a conversion sequence determined by the user according to the present invention.

For example, the user preference for a contents item in FIG. 4 is provided with the sequence in which non-conversion of video is first, the conversion of video into audio is second, the conversion of video into image is third, and the conversion of video into text is fourth. In this case, compared to the existing general conversion sequence, modality conversion is performed that non-conversion of video is maintained, the conversion of video into images is removed, the conversion of video into audio is maintained, and the conversion of video into text is maintained. As a result, a new contents value model, as shown in FIG. 7, is constructed.

Figure 8:
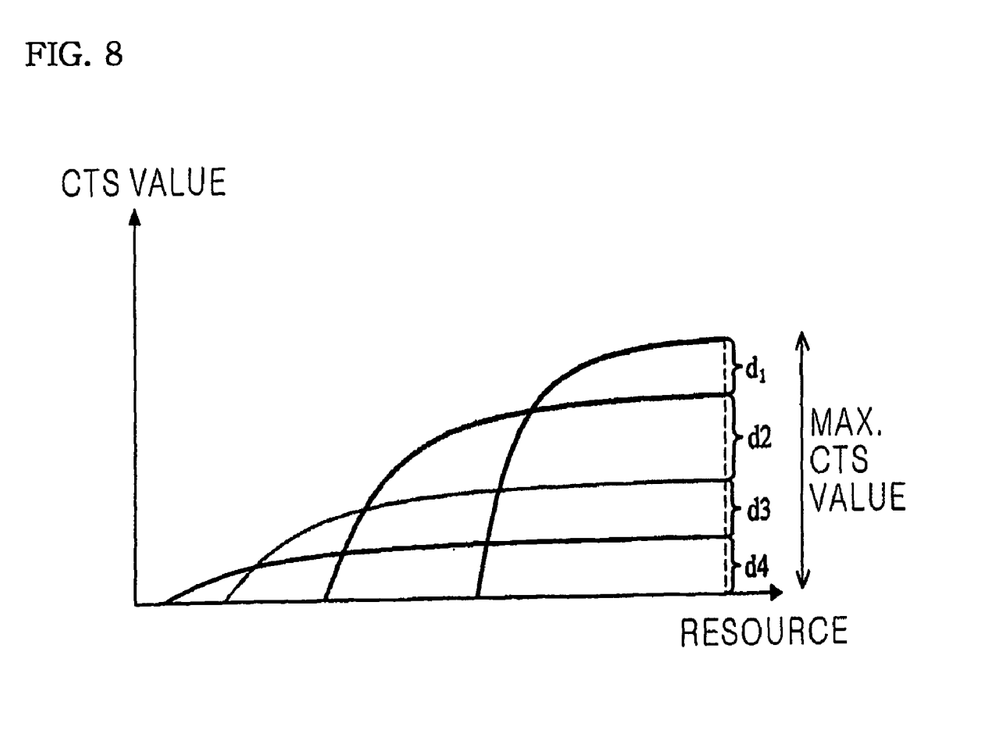
FIG. 8 is a view showing the distance relation between curves based on the weights of the present invention.

Third, importance information in the modality conversion is considered. The importance information, as shown in FIG. 8, is used to adjust the distances ($d_{ij}$) between the contents value curves of modalities. The adjustment of distances between the contents value curves influences the intersection points of the curves or the changes of boundaries. If the importance of a modality is increased, the region where conversion is performed is increased by the changes of intersection points. In this case, it should be noticed that the sum of the distances ($d_{ij}$) is fixed, and coincides with the maximum contents value of a contents item i.

If $W_{ij}$ is importance information for the conversion j of the contents item i, the adjusted distances are calculated by Equation 7.

$$d'_{ij} = w_{ij} * d_{ij} \tag{7}$$

The relative distance of the new calculated distances ($d'_{ij}$) reflect the preference of the user. However, the distance needs to be re-adjusted so as to allow the sum of the distances not to be changed, and can be obtained by Equation 8.

$$d^s_{ij} = \frac{w_{ij} d_{ij} \sum_i d_{ij}}{\sum_j w_{ij} d_{ij}} \tag{8}$$

In Equation 8, $d^s$ is a finally adjusted distance. That is, as a result, it can be known that $$\sum_j d_{ij} = \sum_j d^s_{ij}.$$

Figure 9:
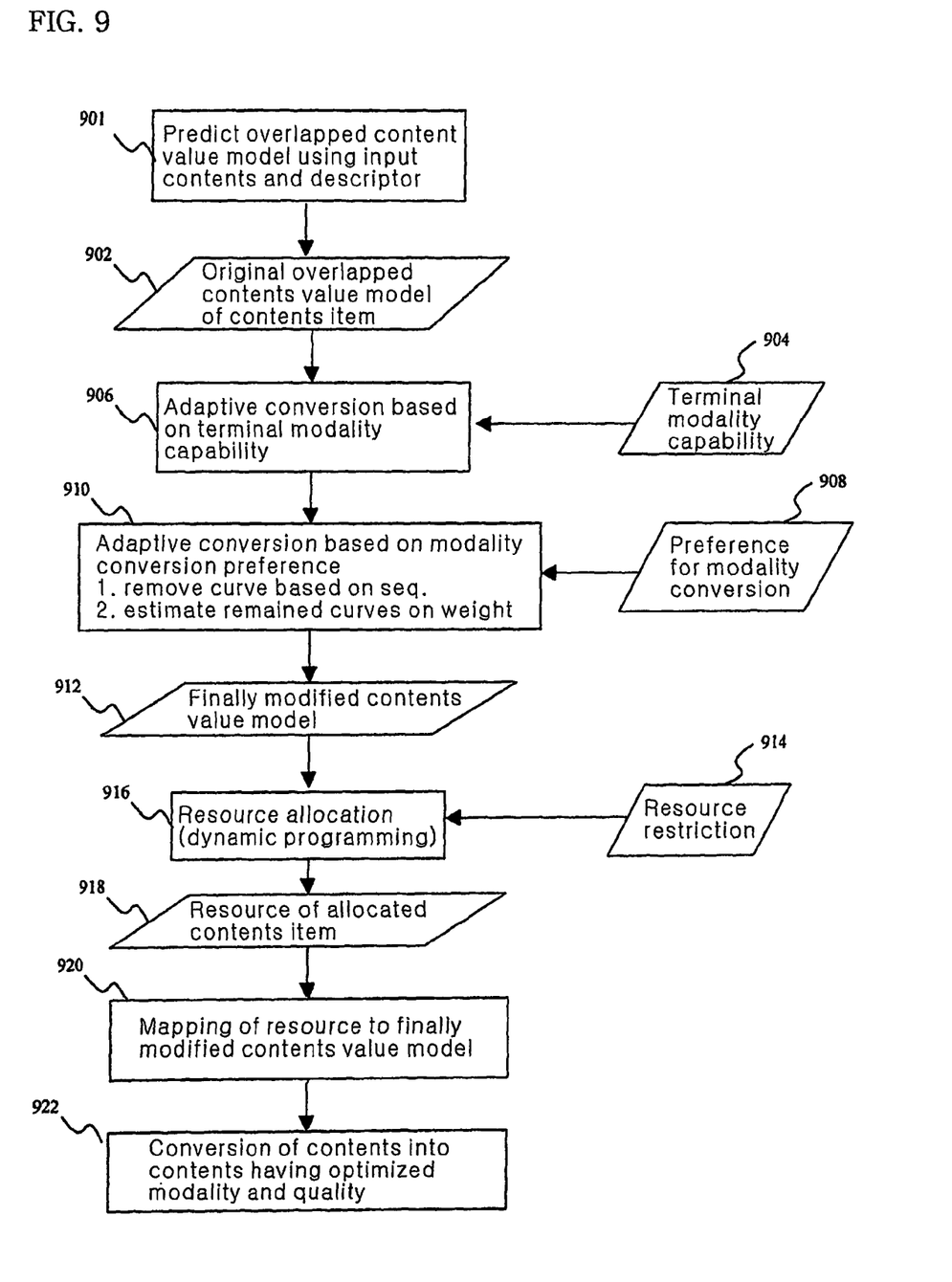
FIG. 9 is a flowchart showing a method of processing the adaptive conversion of contents of the present invention.

FIG. 9 is a flowchart showing a method of adaptively converting the modality of multimedia contents according to the present invention. An overlapped contents value model for a contents item is predicted using input multimedia contents and the descriptor of the contents at step 901. The predicted contents value model 902 is primarily modified by removing the curve of contents value, whose modality is not supported, with reference to modality capability 904 supported by a terminal, at step 906. Then, with reference to the user preference 908 for the modality conversion of a contents provider, conversion sequence information based on a conventional conversion sequence and user preference is inspected. If, as a result of the inspection, the conventional conversion sequence is prior to a sequence provided according to the user preference, a modality curve corresponding to the conversion is removed, and the distance values of curves remaining based on the importance information of the conversion based on the user preference are adjusted at step 910, so that a finally converted contents value model 912 is produced.

The above-described process can be considered as an example of using terminal characteristic information and user preference in the adaptive conversion of contents. Furthermore, the contents provider can find out a method appropriate to a specific application and apply the method.

Furthermore, in the present invention, a resource allocation for all contents items is performed at step 916 while an overlapped contents value model and a resource restriction 914 are given. An adaptively converted document allocates a user an optimal value. A resource is mapped to the finally converted contents value model according to the resource of the allocated contents item of step 918, at step 920. Accordingly, the contents are converted into contents having optimal modality and quality at step 922.

The problem of a resource allocation has been discussed for several decades, and the problem can be solved by two basic methods. One of the two basic methods is a Lagrangian Method, and the other is a dynamic programming method. In the thesis entitled "Adapting Multimedia Internet Contents for Universal Access," Rakesh Mohan, John R. Smith, and Chung-Sheng Li, "IEEE Trans. Multimedia," Vol. 1, No. 1, pp. 104-114, March 1999, the Lagrangian Method is used to find a contents version allocating the proper amount of resources. However, since the method models the contents value by a single concave curve, such as a natural logarithm function, the method can be applied to only a concave contents value model. If the contents value model has a convex curve, the model is replaced with a concave curve.

In the application of contents adaptive conversion supporting modality conversion, several restrictions need to be added to the dynamic programming method. First, when a user selects several conversion modalities (e.g., modality conversion of video into audio), the dynamic programming method generally searches the entire scopes of resources. Even in the case that the contents value is zero, the resource search is performed. In this case, as a result of the searching, several contents items, whose contents value is zero, can be extracted. This imports that a contents item has been deleted, and conclusively imports that the result can be different from a result expected by the user. To avoid such a situation, the scope of searching is limited to search only when the contents value is not zero.

Second, the result of the searching of the dynamic programming may not be a unique solution. Other solutions can convert the modalities of contents items into different modalities. For example, if there are two items, in the first solution, it is assumed that one contents item has a video modality and the other contents item has the image modality of low quality. In the second solution, it is assumed that all the two contents items have the image modality of high quality. In the two solutions, even if a user initially prefers the video, that is, the user prefers the first solution, the two methods have the same contents value, so that it cannot be determined which is selected. Accordingly, after searching, a restriction, in which user preference must be inspected, is set on the dynamic programming method. Thus, a solution having many contents items of higher modality conversion turn, which are appropriate to the user preference, is selected as a final solution.

INDUSTRIAL APPLICABILITY

According to the present invention, by applying the preference of a user to the modality conversion process of contents, the optimized modality conversion of the contents is enabled according to not only the characteristics of a terminal and a network but also the personal modality conversion preference characteristics of the user, so that a universal multimedia access can be effectively achieved. Accordingly, it is possible that a user who prefers a specific contents modality can consume a contents modality that cannot be consumed in a general resource allocation in accordance with the preference of the user. As an example, the present invention can be effectively used by allowing a sight or hearing-impaired person, who cannot consume a specific modality, to have the right of the selection of a modality. Additionally, since the present invention meets the principles of the digital item adaptive conversion parts of MPEG-7 and MPEG-21, which are media international standards, the present invention can be provided with interchangeability with such a system.

The invention claimed is:

1. A device for adaptively converting a modality of multimedia contents, the device comprising:
   an input for receiving data specifying multimedia contents, metadata of the multimedia contents, and user preference for the modality conversion; and
   a converter for converting the modality of the input multimedia contents;
   wherein the input is adapted for receiving a multimedia contents item which comprises a unit expressible in any one of different modalities, the unit being the whole of the multimedia contents item or being a portion of the multimedia contents item, wherein the user preference for the modality conversion comprises a qualitative preference and a quantitative preference, wherein the qualitative preference indicates a sequence of modalities according to the user preference for the modalities, and the quantitative preference indicates a relative quantitative importance of at least two of the modalities to the user;
   wherein the converter is for expressing the unit in a modality in which the unit is to be transmitted to the user, the converter using at least the qualitative preference in determining the modality in which the unit is to be transmitted;
   wherein the converter comprises:
   means for predicting an overlapped contents model using the input multimedia contents and input metadata of the contents, the overlapped contents model specifying, for each said modality and an associated range of resource values, a contents value curve which specifies, for the associated modality, a relationship between (i) a resource value in the associated range of resource values and (ii) a content value, wherein at least two of the contents value curves intersect inside one of the ranges;
   means for modifying the overlapped contents model using the user preference for the modality conversion; and
   means for determining a resource restriction and expressing the multimedia contents according to the resource restriction in a form corresponding to a maximum contents value of the modified overlapped contents model.

2. The device according to claim 1, wherein the means for modifying the overlapped contents model is for additionally modifying the overlapped contents model depending on a type of a terminal to which the multimedia contents are to be transmitted.

3. The device according to claim 1, wherein:
   the means for modifying is to remove or not remove one or more of the contents value curves from the overlapped contents model in accordance with the qualitative preference; and
   wherein the means for modifying is for adjusting the contents value curves in accordance with the quantitative preference.

4. The device according to claim 1, wherein the user preference for the modality conversion is described in an eXtended Markup Language (XML) form.

5. The device according to claim 1, wherein the user preference for the modality conversion comprises user preference for general contents modality conversion and user preference for specific modality conversion.

6. The device according to claim 1, wherein the user preference for the modality conversion comprises preference for video modality conversion, preference for image modality conversion, preference for audio modality conversion, and preference for text modality conversion.

7. The device of claim 1 wherein the unit is associated with video modality, and unit is expressible in the video modality and at least one of image modality, audio modality, and text modality.

8. The device of claim 1 wherein the quantitative preference comprises a weight assigned to each modality and indicating the modality's relative quantitative importance to the user.

9. A method of adaptively converting a modality of multimedia contents, the method comprising:
   receiving, by a device, multimedia contents and metadata of the multimedia contents from an outside source, wherein the multimedia contents comprise a multimedia contents item comprising a unit expressible in any one of different modalities, the unit being the whole of the multimedia contents item or being a portion of the multimedia contents item;
   receiving, by the device, user preference for modality conversion, wherein the user preference for the modality conversion comprises a qualitative preference and a quantitative preference, wherein the qualitative preference indicates a sequence of modalities according to the user preference for the modalities, and the quantitative preference indicates a relative quantitative importance of at least two of the modalities to the user;
   adaptively converting, by the device, a modality of the input multimedia contents according to the metadata of the contents and at least the quantitative preference; and
   outputting, by the device, the converted multimedia contents;
   wherein the method further comprises additionally receiving a resource restriction, wherein the adaptive conversion of the modality is performed while additionally considering the resource restriction;
   wherein the adaptive converting of the modality comprises:
   predicting an overlapped contents model using the input multimedia contents and the input metadata of the contents, the overlapped contents model specifying, for each said modality and an associated range of resource values, a contents value curve which specifies, for the associated modality, a relationship between (i) a resource value in the associated range of resource values and (ii) a content value, wherein at least two of the contents value curves intersect inside one of the ranges;
   modifying the overlapped contents model using the user preference for modality conversion; and
   converting a modality of the multimedia contents to allow the multimedia contents to be represented in a form corresponding to a maximum contents value of the modified overlapped contents model under the resource restriction.

10. The method according to claim 9, wherein the quantitative preference is represented by a weight of each modality, wherein the weights indicate relative quantitative importance of each modality to the user.

11. The method according to claim 9, wherein the user preference for modality conversion is described in an XML form.

12. The method according to claim 9, wherein the user preference for modality conversion comprises user preference for general contents modality conversion and user preference for specific modality conversion.

13. The adaptive conversion method according to claim 9, wherein the user preference for the modality conversion comprises preference for expressing the multimedia contents item in video modality, in image modality, in audio modality, and in text modality.

14. The method according to claim 13, wherein the multimedia contents item is received in video modality.

15. The adaptive conversion method according to claim 9, wherein the multimedia contents item is received in image modality, and the user preference for modality conversion comprises the user preference for expressing the multimedia contents item in image modality, in audio modality, and in text modality.

16. The method according to claim 9, wherein the multimedia contents item is received in audio modality, and the user preference for modality conversion comprises the user preference for expressing the multimedia contents item in audio modality and in text modality.

17. A device for adaptively converting a modality of multimedia contents, the device comprising:
 means for receiving a multimedia contents item and metadata of the multimedia contents item from an outside source;
 means for receiving user preference for modality conversion of the multimedia item, the user preference being represented by a sequence of modalities and a weight of each modality, wherein:
 the sequence indicates a sequence of modalities according to the user preference for the modalities; and
 the weights indicate relative quantitative importance of each modality to the user;
 means for obtaining an overlapped contents model specifying, for each said modality and an associated range of resource values, a contents value curve which specifies, for the associated modality, a relationship between (i) a resource value in the associated range of resource values and (ii) a content value, wherein at least two of the contents value curves intersect inside one of the ranges;
 means for modifying the overlapped contents model using the user preference for the modality conversion;
 means for adaptively converting a modality of the input multimedia contents item according to the metadata of the contents and the user preference for the modality conversion; and
 means for outputting the converted multimedia contents item;
 wherein the means for modifying is to remove or not remove one or more of the contents value curves from the overlapped contents model in accordance with the sequence;
 wherein the means for modifying is for adjusting the contents value curves in accordance with the weights if the weights are not equal to each other; and
 the means for adaptively converting is for converting based on the overlapped contents model generated by the means for modifying.

18. A method for providing a multimedia contents item to a user's terminal over a network, the method comprising:
 (1) obtaining, by a device, data specifying: (i) a unit, wherein the unit is a portion or a whole of the multimedia contents item and the unit is expressed in at least a first modality, wherein the unit is also expressible in one or more modalities other than the first modality, (ii) user preference for modality of the multimedia contents item, and (iii) metadata providing an indication of preferences in conversion of the multimedia contents item from the first modality to the one or more modalities other the first modality;
 (2) for the unit performing operations of:
 (2A) obtaining, by the device, a resource restriction, and determining from the resource restriction, the metadata and the user preference whether or not the unit is to be converted to a modality other than the first modality before transmission to the terminal;
 (2B) if it is determined by the device, in operation (2A), that the unit is to be modality-converted, then performing, by the device, modality conversion of the unit and transmitting the modality-converted unit over the network to the terminal, wherein modality conversion is conversion to a different modality;
 (2C) if it is determined by the device, in operation (2A), that the unit is NOT to be modality-converted, then transmitting the unit over the network to the terminal without modality conversion of the unit;
 wherein the metadata comprise data representing a contents model which associates resources with content values for the modalities; and
 the method further comprises:
 (3) determining, by the device, whether or not the contents model is to be modified based on the user preference;
 (4) if the user preference indicates that the contents model is to be modified, then modifying, by the device, the contents model based on the user preference;
 (5) if the user preference indicates that the contents model is NOT to be modified, then NOT modifying, by the device, the contents model based on the user preference;
 wherein operation (2A) is performed using the contents model provided by operations (3)-(5);
 wherein the operation (2A) maximizes the contents value based on the contents model provided by the operations (3)-(5);
 wherein the contents model in the metadata is an overlapped contents model which specifies, for each said modality and an associated range of resource values, a contents value curve which specifies, for the associated modality, a relationship between (i) a resource value in the associated range of resource values and (ii) a content value, wherein at least two of the contents value curves intersect inside one of the ranges;
 wherein the user preference comprises a weight associated with each of one or more of the modalities, and at least two of the modalities are associated with different weights; and
 in the operation (4), the associated contents value curves are modified to increase the content values associated with the modality of a greater weight relative to the content values associated with the modality of a smaller weight.

19. The method of claim 18 wherein the user preference indicates a sequence of modalities according to the user preference for the modalities; and
 if said sequence indicates a higher user preference for a first modality over a second modality, but the second modality's contents value curve indicates a higher content value than the first modality's contents value curve at least for all the resource values higher than a predefined resource value, then operation (4) is performed in which the content curve associated with the second modality is removed from the overlapped contents model.

20. A device for providing a multimedia contents item to a terminal over a network, the device being for:
 (1) obtaining data specifying: (i) a unit, wherein the unit is a portion or a whole of the multimedia contents item, and the unit is expressed in at least a first modality, wherein the unit is also expressible in one or more modalities other than the first modality, and (ii) user preference for modality of the multimedia contents item;

(2) for the unit, performing operations of:

(2A) obtaining, by the device, a resource restriction, and determining from the resource restriction and the user preference whether or not the unit is to be converted to a modality other than the first modality before transmission to the terminal;

(2B) if it is determined by the device, in operation (2A), that the unit is to be modality-converted, then performing, by the device, modality conversion of the unit and transmitting the modality-converted unit over the network to the terminal, wherein modality conversion is conversion to a different modality;

(2C) if it is determined by the device, in operation (2A), that the unit is NOT to be modality-converted, then transmitting the unit over the network to the terminal without modality conversion of the unit;

wherein operation (1) also comprises receiving metadata providing an indication of preferences in conversion of the multimedia contents item from the first modality to the one or more modalities other the first modality; and wherein the determining operation in (2A) depends on the metadata, and the metadata comprise data representing a contents model which associates resources with content values for the modalities; and the method further comprises:

(3) determining, by the device, whether or not the contents model is to be modified based on the user preference;

(4) if the user preference indicates that the contents model is to be modified, then modifying, by the device, the contents model based on the user preference;

(5) if the user preference indicates that the contents model is NOT to be modified, then NOT modifying, by the device, the contents model based on the user preference;

wherein operation (2A) is performed using the contents model provided by operations (3)-(5);

wherein the operation (2A) maximizes the contents value based on the contents model provided by the operations (3)-(5);

wherein the contents model in the metadata is an overlapped contents model which specifies, for each said modality and an associated range of resource values, a contents value curve which specifies, for the associated modality, a relationship between (i) a resource value in the associated range of resource values and (ii) a content value, wherein at least two of the contents value curves intersect inside one of the ranges;

wherein the user preference comprises a weight associated with each of one or more of the modalities; and if at least two of the modalities are associated with different weights, then operation (4) is performed in which the associated contents value curves are modified to increase the content values associated with the modality of a greater weight relative to the content values associated with the modality of a smaller weight.

21. The device of claim 20 wherein the user preference indicates a sequence of modalities, the sequence indicating an order of user preference for the modalities; and if said sequence indicates a higher user preference for a first modality over a second modality, but the second modality's contents value curve indicates a higher content value than the first modality's contents value curve at least for all the resource values higher than a predefined resource value, then operation (4) is performed in which the content curve associated with the second modality is removed from the overlapped contents model.

* * * * *